(12) United States Patent
McAuley

(10) Patent No.: US 11,112,328 B2
(45) Date of Patent: Sep. 7, 2021

(54) TEMPERATURE BASED LEAK DETECTION FOR BLOWOUT PREVENTERS

(71) Applicant: Baker Hughes Oilfield Operations LLC, Houston, TX (US)

(72) Inventor: Alexander McAuley, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 217 days.

(21) Appl. No.: 16/397,384

(22) Filed: Apr. 29, 2019

(65) Prior Publication Data
US 2020/0340879 A1    Oct. 29, 2020

(51) Int. Cl.
*G01M 3/00*    (2006.01)
*E21B 33/06*    (2006.01)

(52) U.S. Cl.
CPC ........... *G01M 3/002* (2013.01); *E21B 33/062* (2013.01)

(58) Field of Classification Search
CPC ...... E21B 33/06; E21B 33/062; E21B 33/085; G01M 3/002
See application file for complete search history.

(56) References Cited

U.S. PATENT DOCUMENTS

| | | | | |
|---|---|---|---|---|
| 1,569,247 A | * | 1/1926 | Abercrombie | E21B 33/062 277/325 |
| 4,174,000 A | * | 11/1979 | Milberger | E21B 33/0355 137/236.1 |
| 4,192,379 A | * | 3/1980 | Kennedy, Jr. | E21B 33/06 166/250.08 |
| 4,413,642 A | * | 11/1983 | Smith | E21B 34/16 137/102 |
| 4,750,189 A | * | 6/1988 | Lancaster | F17D 5/04 374/4 |
| 4,880,025 A | * | 11/1989 | McMahan, Jr. | E21B 33/0355 137/1 |

(Continued)

FOREIGN PATENT DOCUMENTS

| | | | | |
|---|---|---|---|---|
| JP | 01079633 A | * | 3/1989 | |
| JP | 03130596 A | * | 6/1991 | |

OTHER PUBLICATIONS

Mohamed et al., "Leak Detection by Temperature and Noise Logging," SPE 161983, 2012.

(Continued)

*Primary Examiner* — David A. Rogers
(74) *Attorney, Agent, or Firm* — Hogan Lovells US LLP

(57) ABSTRACT

A system for blowout prevention includes one or more components controlled at least in part by hydraulics, an inlet line fluidly coupled to receive a pressurized fluid from a hydraulic source, and a plurality of delivery lines fluidly coupled to the inlet line and providing hydraulic fluid to the one or more components. The blowout preventer further includes a temperature control device located on the inlet line, wherein the temperature control device creates a differential between the temperature of a fluid inside the inlet line at the location of the temperature control device and an ambient temperature. The blowout preventer further includes a plurality of temperature sensors located on the plurality of delivery lines at different positions, the plurality of temperature sensors configured to measure the temperature of the delivery line at the respective positions.

20 Claims, 6 Drawing Sheets

(56) References Cited

U.S. PATENT DOCUMENTS

| | | | | |
|---|---|---|---|---|
| 4,947,352 | A * | 8/1990 | Jenkins | G01M 3/3236 702/51 |
| 5,277,249 | A * | 1/1994 | Yenulis | E21B 34/16 166/84.3 |
| 5,372,032 | A * | 12/1994 | Filippi | G01M 3/2892 340/605 |
| 5,918,268 | A * | 6/1999 | Lukas | G01M 3/002 730/40.5 R |
| 5,934,087 | A * | 8/1999 | Watanabe | F25B 49/005 62/126 |
| 6,032,742 | A * | 3/2000 | Tomlin | E21B 33/063 166/345 |
| 6,044,690 | A * | 4/2000 | Williams | E21B 33/063 166/250.08 |
| 6,772,843 | B2 * | 8/2004 | Nice | E21B 33/076 166/337 |
| 7,076,373 | B1 * | 7/2006 | Munsterhuis | F24H 9/2007 702/51 |
| 7,222,674 | B2 * | 5/2007 | Reynolds | E21B 33/035 166/341 |
| 7,300,033 | B1 * | 11/2007 | Whitby | E21B 33/062 251/1.3 |
| 7,334,455 | B2 * | 2/2008 | Yanagi | G01M 3/002 73/49.2 |
| 7,757,772 | B2 * | 7/2010 | Donohue | E21B 33/0355 166/344 |
| 7,918,126 | B2 | 4/2011 | McStay | |
| 8,380,448 | B2 * | 2/2013 | Franklin | G01M 3/2815 702/51 |
| 8,485,260 | B2 * | 7/2013 | Donohue | E21B 33/0355 166/344 |
| 8,727,303 | B2 * | 5/2014 | Araujo | E21B 33/061 251/1.1 |
| 8,746,215 | B2 * | 6/2014 | Perry | B60K 15/03504 123/518 |
| 8,781,743 | B2 * | 7/2014 | McKay | E21B 41/0007 702/6 |
| 8,820,410 | B2 * | 9/2014 | Parks | E21B 33/0355 166/339 |
| 9,429,010 | B2 | 8/2016 | Winters | |
| 10,174,876 | B2 * | 1/2019 | Suzuta | F16L 23/04 |
| 10,436,371 | B2 * | 10/2019 | Yamamoto | G01M 3/00 |
| 10,704,979 | B2 * | 7/2020 | Bailey | G01M 3/2807 |
| 10,712,042 | B2 * | 7/2020 | Passoni | G05D 23/1931 |
| 10,746,205 | B2 * | 8/2020 | Steffenhagen | E21B 34/02 |
| 2001/0032626 | A1 * | 10/2001 | Fabre | F02M 25/0809 123/520 |
| 2006/0161357 | A1 * | 7/2006 | Munsterhuis | F24H 9/2007 702/51 |
| 2007/0157706 | A1 * | 7/2007 | Yanagi | G01M 3/002 73/49.2 |
| 2009/0078028 | A1 | 3/2009 | McStay et al. | |
| 2009/0194290 | A1 * | 8/2009 | Parks | E21B 33/0355 166/339 |
| 2009/0223284 | A1 * | 9/2009 | Buhring | G01N 22/00 73/40.5 A |
| 2012/0111572 | A1 * | 5/2012 | Cargol, Jr. | E21B 33/064 166/363 |
| 2012/0197527 | A1 * | 8/2012 | McKay | E21B 41/0007 702/6 |
| 2013/0062540 | A1 * | 3/2013 | Jurena | E21B 33/062 251/1.3 |
| 2013/0083627 | A1 * | 4/2013 | Yates | E21B 47/18 367/83 |
| 2013/0111985 | A1 | 5/2013 | Veeningen | |
| 2013/0139792 | A1 * | 6/2013 | Perry | B60K 15/03504 123/520 |
| 2015/0028113 | A1 * | 1/2015 | Day | F24F 11/30 236/51 |
| 2015/0094866 | A1 * | 4/2015 | Pereira | E21B 33/0355 700/282 |
| 2016/0076331 | A1 * | 3/2016 | Kalinec | E21B 33/064 166/363 |
| 2016/0177653 | A1 * | 6/2016 | Carrera | E21B 33/064 251/1.3 |
| 2016/0215608 | A1 | 7/2016 | Jaffrey | |
| 2016/0312565 | A1 | 10/2016 | Papadimitriou et al. | |
| 2017/0159393 | A1 | 6/2017 | Orban | |
| 2017/0254719 | A1 * | 9/2017 | Franklin | G01M 3/26 |
| 2018/0087342 | A1 * | 3/2018 | Gottlieb | G01S 15/10 |
| 2018/0223882 | A1 * | 8/2018 | Steffenhagen | E21B 33/061 |
| 2018/0238467 | A1 | 8/2018 | Sundar et al. | |

OTHER PUBLICATIONS

Franklin et al., "Advanced Analysis Identifies Greater Efficiency for Testing BOPs in Deep Water," Dec. 2005 SPE Drilling & Completion, pp. 238-250.

International Search Report issued in PCT/US20/30214 dated Jul. 29, 2020.

* cited by examiner

TEMPERATURE BASED LEAK DETECTION FOR BLOWOUT PREVENTERS

TECHNICAL FIELD

Embodiments of the subject matter disclosed herein generally relate to oil and gas wells, and in particular to improved leak detection for a blowout preventer (BOP) to be utilized in subsea oil and gas wells.

BACKGROUND

Blowout preventers (BOPs) are important safety components in subsea well drilling operations. Typically, a BOP is attached to a wellhead at the sea floor, and provides a bore through which the drill string can pass from the top of the BOP down through the bottom and into the well. The BOP is equipped with BOP rams, which are located on opposing sides of the bore and are designed to close across the bore if needed. Some rams are sealing rams, which seal around the drill pipe to close in the annulus of the well. Other rams are shearing rams, and are designed to shear the drill pipe and anything else in the bore, to completely close in the bore. The BOP and its rams provide an effective barrier against dangerous pressure surges that may develop in a well.

In order to operate the BOP rams, hydraulics are typically used to drive the rams from an open to a closed position. Hydraulic fluid is applied to the rams via a fluid conduit that connects the rams to a fluid reservoir or accumulator. A valve or series of valves in the fluid conduit controls the fluid flow through the conduit, which in turn determines the hydraulic pressure applied to the rams. The forces needed to drive the BOP rams can be large, as the equipment is heavy, and much force may be required to shear the steel drill string and other components in the bore. Accordingly, if it becomes necessary for an operator to fire the rams and close the BOP, a significant amount of hydraulic pressure is applied to close the rams. When a BOP is in a static state, (i.e., the rams are not closing or opening), the hydraulic system is in a static state, with no flow. However, the hydraulic fluid may remain pressurized, to be able to close the rams quickly once a signal is received.

Occasionally, a leak may occur in the hydraulic system for various reasons. Such a leak may degrade the BOP's performance, such as loss of hydraulic pressure in the static state and loss of hydraulic fluid. For example, if there is a loss in hydraulic pressure in the static state, it may take longer to generate the hydraulic force needed to close a ram. Thus, leak detection is an important aspect of BOP maintenance and performance. Conventionally, leakage detection is generally performed by monitoring surface equipment. However, it is difficult to determine what equipment or what portion of the hydraulic system may be the cause of the leak when the BOP stack is subsea. Alternatively, troubleshooting and visual inspection using a remotely operated vehicle (ROV) may be performed to identify the source of the leak. However, it may take a significant amount of time to locate the leak and may only be possible if the leak is severe enough.

SUMMARY OF THE INVENTION

In accordance with one or more embodiments, a blowout preventer includes a plurality of components, including at least one of an annular preventer or a ram. The blowout preventer also includes an inlet line fluidly coupled to receive a pressurized fluid from a hydraulic source, and a plurality of delivery lines fluidly coupled to the inlet line and providing hydraulic fluid to the plurality of components. The blowout preventer further includes a temperature control device located on the inlet line, wherein the temperature control device creates a differential between the temperature of a fluid inside the inlet line at the location of the temperature control device and an ambient temperature. The blowout preventer also includes a plurality of temperature sensors located on the plurality of delivery lines at different locations, the plurality of temperature sensors configured to measure the temperature of the delivery line at the respective locations.

In accordance with another embodiment, a system for blowout prevention includes one or more components controlled at least in part by hydraulics, an inlet line fluidly coupled to receive a pressurized fluid from a hydraulic source, and a plurality of delivery lines fluidly coupled to the inlet line and providing hydraulic fluid to the one or more components. The blowout preventer further includes a temperature control device located on the inlet line, wherein the temperature control device creates a differential between the temperature of a fluid inside the inlet line at the location of the temperature control device and an ambient temperature. The blowout preventer further includes a plurality of temperature sensors located on the plurality of delivery lines at different positions, the plurality of temperature sensors configured to measure the temperature of the delivery line at the respective positions.

In accordance with another embodiment, a method of detecting a leak in a hydraulic system of a BOP includes determining an ambient temperature of a BOP in static state, the BOP comprising an inlet line fluidly coupling a plurality of hydraulic delivery lines to a hydraulic source, heating or cooling the fluid at a portion of the inlet line, monitoring respective temperatures of the plurality of hydraulic delivery lines, detecting that a temperature of a specific hydraulic delivery line of the plurality of hydraulic delivery lines is different from the ambient temperature by at least a threshold amount, determining that a leak is present in the specific hydraulic delivery line, and generating an indication of the leak and the specific hydraulic delivery line.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
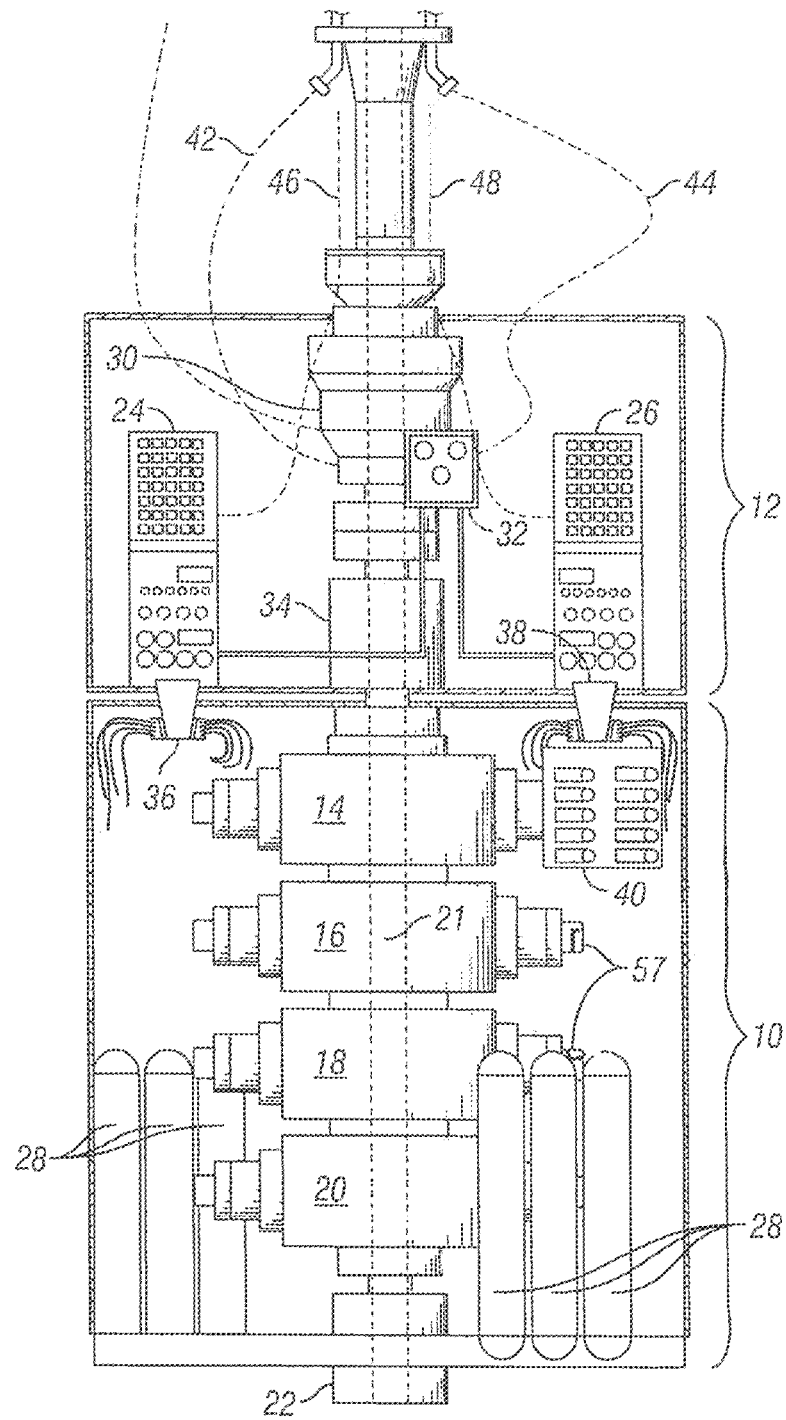
FIG. 1 illustrates a representation of a BOP stack assembly, in accordance with some embodiments of the present disclosure.

The foregoing aspects, features, and advantages of the present embodiments will be further appreciated when considered with reference to the following description of preferred embodiments and accompanying drawings, wherein the reference numerals represent like elements. In describing the preferred embodiments of the technology illustrated in the appended drawings, specific terminology will be used for the sake of clarity. However, the technology is not intended to be limited to the specific terms used, and it is to be understood that each specific term includes equivalents that operate in a similar manner to accomplish a similar purpose.

FIG. 1 shows a subsea blow out preventer (BOP) assembly, including a lower stack 10 and a lower marine riser package (LMRP) 12. Typically, the lower stack includes a series of stacked rams 14, 16, 18, 20. The lower stack 10 of FIG. 1, for example, can include a blind shear ram 14, a casing shear ram 16, and pipe rams 18, 20. In practice, the rams 14, 16, 18, 20 surround a bore 21 through which a drill pipe (not shown) passes. The lower stack 10 is positioned atop the wellhead 22, so that the drill pipe passes from the bottom of the lower stack 10 into the well through the wellhead 22. The purpose of the rams is to control the well if needed. For example, if a surge of pressure develops in the well annulus, the pipe rams 18, 20 can close and seal around the pipe to contain the pressure in the annulus below the pipe rams 18, 20. In some cases it may be necessary or desirable for an operator to completely close in a well, in which case the blind shear ram 14 and/or the casing shear ram 16 can close to sever everything in the bore 21, including the drill pipe.

Typically, the rams 14, 16, 18, 20 are hydraulically controlled. Hydraulic pressure can be supplied via the control pods 24, 26, which can be positioned in the LMRP 12. The provision of two control pods 24, 26, often referred to in the industry as a blue pod 24 and a yellow pod 26, allows for redundancy in the control system, and also increased control capacity. In addition to the control pods 24, 26, there can be provided accumulator bottles 28. The accumulator bottles 28 can be filled with gas at high pressure relative to the ambient pressure of the sea water, and when discharged can exert a strong hydraulic force on the rams 14, 16, 18, 20, causing them to close. The accumulator bottles 28 ore often provided as a backup option to the control pods 24, 26, as they must be recharged after each use, and so are not as convenient as the pods 24, 26 for purposes of closing the rams 14, 16, 18, 20.

Additional features of the BOP assembly of FIG. 1 include the annular BOP 30, a conduit manifold 32, an LMRP connector 34, hydraulic wedges 36, 38, and shuttle panel 40. The BOP assembly further includes communication umbilicals 42, 44 and power umbilicals 46, 48 that provide communication and power capabilities, respectively to the control pods 24, 26.

Figure 2:
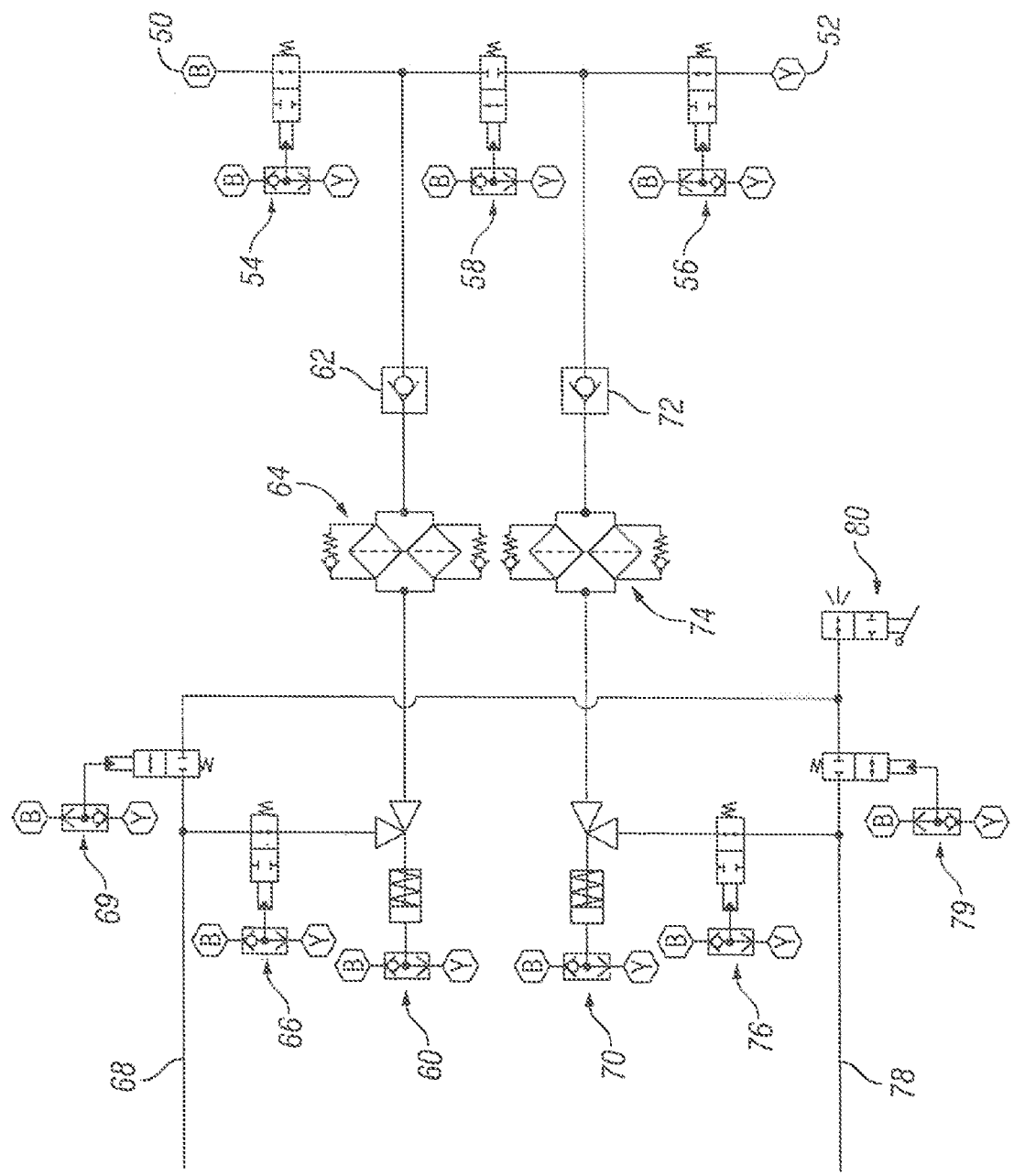
FIG. 2 illustrates a representation of a hydraulic system of a BOP, in accordance with some embodiments of the present disclosure.

Referring now to FIG. 2, there is shown a hydraulic circuit of an embodiment of the present technology. Specifically, there is shown a blue pod hydraulic supply 50 and a yellow pod hydraulic supply 52. The blue pod hydraulic supply 50 is fluidly connected to a blue pod isolation valve 54, while the yellow pod hydraulic supply 52 is fluidly connected to a yellow pod isolation valve 56. A rigid conduit cross-over valve 58 can be provided between the blue pod isolation valve 54 and the yellow pod isolation valve 56. In many BOP operations, both blue and yellow pod isolation valves 54, 56 are in the open state, so that hydraulic functions downstream are controlled by only one of the pods 24, 26 which have internal isolation valves (not shown). The blue or yellow pod isolation valves 54, 56 are typically only closed in the event that one pod or the other has an uncontrolled leak.

With respect to the portion of the hydraulic circuit corresponding to the blue pod 24, when the blue pod isolation valve 54 is in the open state, the blue pod supply 50 is in fluid communication with a first supply valve 60. In some embodiments, such as that shown in FIG. 2, a blue conduit check valve 62 and/or a blue conduit filter assembly 64 can be positioned between the blue pod isolation valve 54 and the first supply valve 60. The blue conduit check valve 62 can serve to prevent backflow of fluid toward the blue conduit filter assembly 64, blue flow control choke valve 60, and blue rigid conduit isolation valve 66. The blue rigid conduit filter assembly 64 serves to filter contaminates and debris from hydraulic fluid in the conduits.

Once fluid passes through the blue rigid conduit 68 it can optionally pass through the blue rigid conduit isolation valve 66 downstream through the first supply valve 60 through the rigid conduit filters 64, check valve 62, and to the pod isolation valve 54. Thereafter, the fluid can pass through the blue pod supply 50. Alternately, the fluid can pass through the blue rigid conduit dump valve 69, through to the blue manual rigid conduit dump valve 80, and on to the environment. Blue pod isolation valve 54 communicates with downstream functions, such as, for example, the BOP rams 14, 16, 18, 20. Adjustment of hydraulic pressure in the blue supply line 68 can open or close the rams 14, 16, 18, 20, collectively or individually as desired by a drilling operator. Also shown in the embodiment of FIG. 2 is a blue dump valve 69 which can serve to bleed pressure from the blue supply line 68 typically during flushing operations to clean the lines prior to operations. In practice, the blue dump valve 69 can be opened to allow venting of fluid into the environment or back to a reservoir at the surface or elsewhere. The blue dump valve 69 can thus act as a safeguard against over pressurization of the blue supply line 68. The blue dump valve 69 can typically be a normally closed valve.

Similarly with respect to the portion of the hydraulic circuit corresponding to the yellow pod 26, when the yellow pod isolation valve 56 is in the open state, the yellow pod supply 52 is in fluid communication with a second supply valve 70. In some embodiments, such as that shown in FIG. 2, a yellow conduit check valve 72 and/or a yellow conduit filter assembly 74 can be positioned between the yellow pod isolation valve 56 and the second supply valve 70. The yellow conduit check valve 72 can serve to prevent backflow of fluid toward yellow filter housing 74, yellow flow control choke valve 70, and yellow rigid conduit isolation valve 76. The yellow rigid conduit filter assembly 74 can serve to filter contaminates and debris from hydraulic fluid in the conduits.

Once fluid passes through the yellow rigid conduit 78 it can optionally pass through the yellow rigid conduit isolation valve 76 downstream through the first supply valve 70 through the rigid conduit filters 74, check valve 72, and to the pod isolation valve 56. Thereafter, the fluid can pass through the yellow pod supply 52. Alternately, the fluid can pass through to the yellow manual rigid conduit dump valve 80, and on to the environment. Yellow pod isolation valve 56 communicates with downstream functions, such as, for example, the BOP rams 14, 16, 18, 20. Adjustment of hydraulic pressure in the yellow supply line 78 can open or close the rams 14, 16, 18, 20, collectively or individually as desired by a drilling operator. Also shown in the embodiment of FIG. 2 is a yellow dump valve 79 which can serve to bleed pressure from the yellow supply line 78 typically during flushing operations to clean the lines prior to operations. In practice, the yellow dump valve 79 can be opened to allow venting of fluid into the environment or back to a reservoir at the surface or elsewhere. The yellow dump valve 79 can thus act as a safeguard against over pressurization of the yellow supply line 78. The yellow dump valve 79 can typically be a normally closed valve. The system can also include a remotely operated vehicle (ROV) flush valve 80 in fluid communication with both the blue and yellow dump valves 69, 79 to flush the conduits is desired.

One challenge with some known BOP systems is that a leak may occur in the hydraulic system. Such a leak may degrade the BOP's performance, such as loss of hydraulic pressure in the static state and loss of hydraulic fluid. For example, if there is a loss in hydraulic pressure in the static state, it may take longer to generate the hydraulic force needed to close a ram. Thus, leak detection is an important aspect of BOP maintenance and performance. Conventionally, leakage detection is generally performed by monitoring surface equipment. However, it is difficult to determine what equipment or what portion of the hydraulic system may be the cause of the leak when the BOP stack is subsea. Alternatively, troubleshooting and visual inspection using an remotely operated vehicle (ROV) may be performed to identify the source of the leak. However, it may take a significant amount of time to locate the leak and may only be possible if the leak is severe enough. The present disclosure provides systems and method for temperature based leak detection that can detect leaks quickly and effective.

Figure 3:
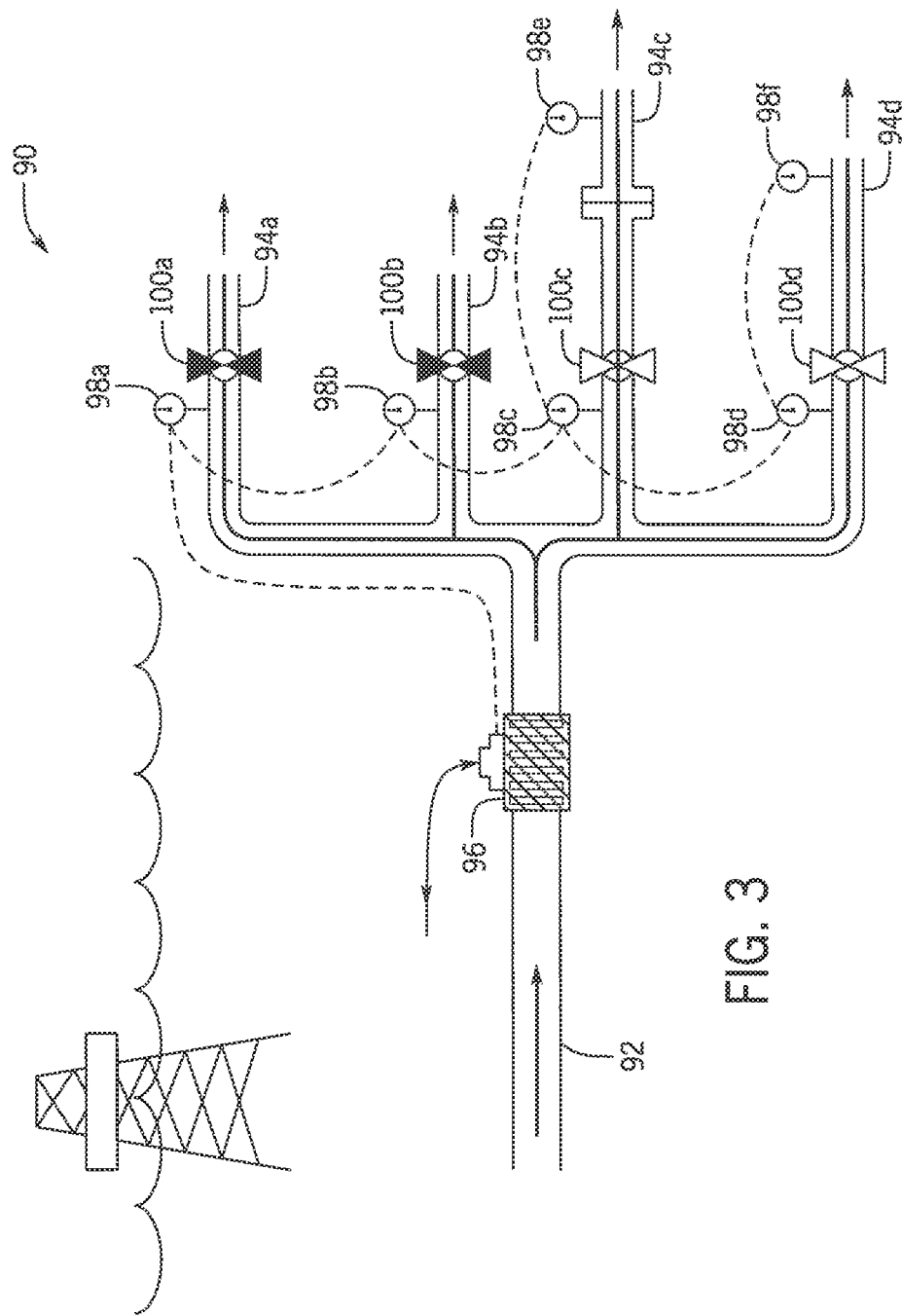
FIG. 3 illustrates a representation of a portion of a hydraulic system of a BOP, in accordance with some embodiments of the present disclosure.
Figure 4:
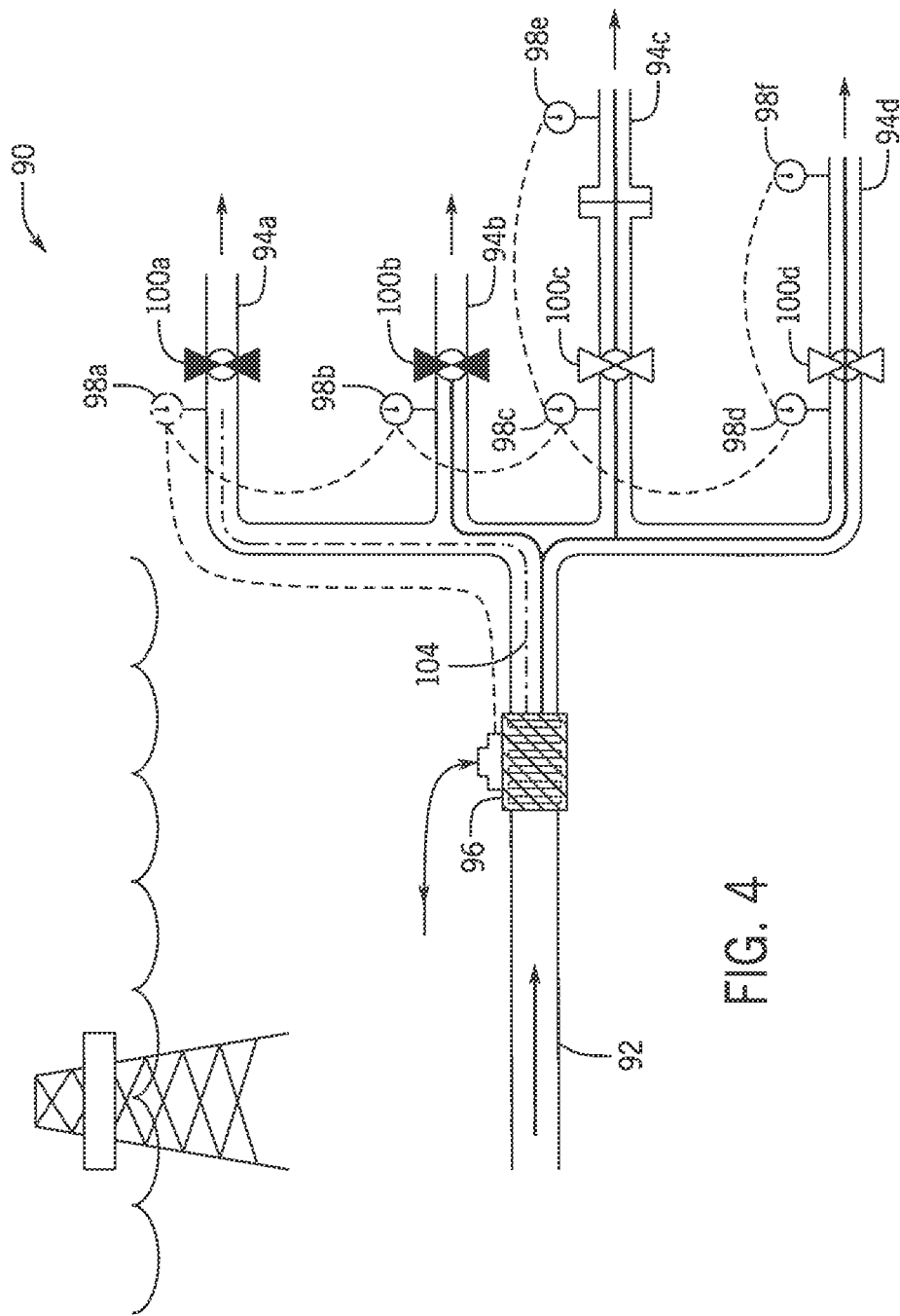
FIG. 4 illustrates a representation of the hydraulic system, illustrating a scenario in which there is a leak, in accordance with some embodiments of the present disclosure.
Figure 5:
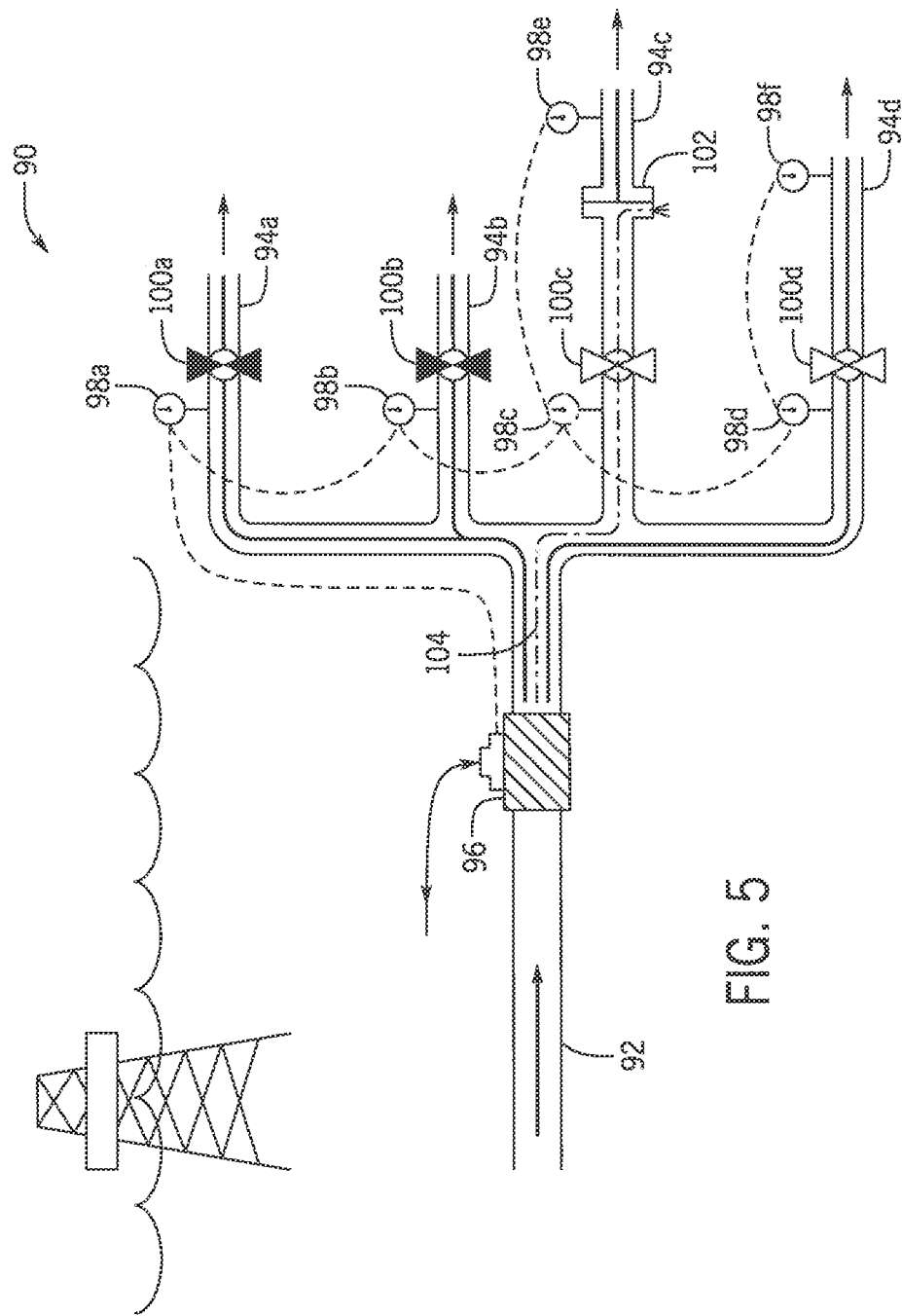
FIG. 5 illustrates a representation of the hydraulic system, illustrating another scenario in which there is a leak, in accordance with some embodiments of the present disclosure.
Figure 6:
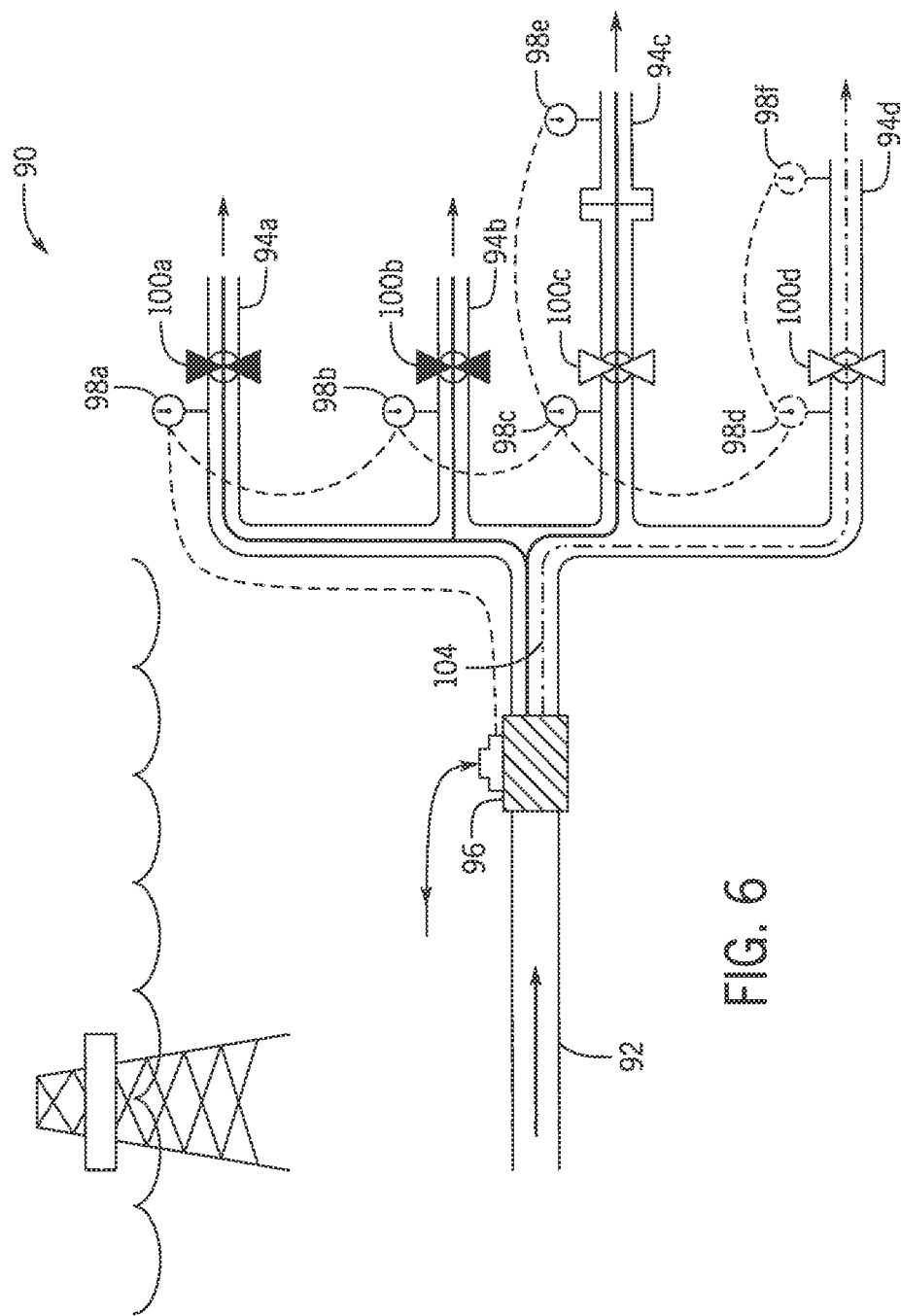
FIG. 6 illustrates a representation of the hydraulic system, illustrating yet another scenario in which there is a leak, in accordance with some embodiments of the present disclosure.

FIG. 3 illustrates a representation of a portion of a hydraulic system 90 of a BOP, in which the hydraulic system does not have a leak, in accordance with some embodiments of the present disclosure. FIGS. 4-6 illustrate a representation of a portion of a hydraulic system 90 of a BOP, in which the hydraulic system a leak various locations, in accordance with some embodiments of the present disclosure. Referring first to FIG. 3, which illustrates a case in which there is no leak, the hydraulic system 90 includes an inlet line 92 fluidly coupled to receive a pressurized fluid from a hydraulic source (not shown), and a plurality of delivery lines 94a, 94b, 94c, 94d fluidly coupled to the inlet line 92 and providing hydraulic fluid to a plurality of components, such as one or more rams.

A temperature control device 96 is located on the inlet line 94 and is configured to create a temperature differential between the temperature of a fluid inside the inlet line 92 at the location of the temperature control device 94 and an ambient temperature. The temperature control device 96 may include a heating element configured to raise the temperature of the fluid inside the inlet line 92 at the location of temperature control device 96 to a predetermined number of degrees above the ambient temperature. For example, the temperature control device 96 may heat the inlet line 92 to maintain the temperature of the fluid inside the inlet line 92 at 10 degrees above the ambient temperature. Alternatively, the temperature control device 96 may include a cooling element configured to lower the temperature of the fluid inside the inlet line 92 at the location of temperature control device 92 to a predetermined number of degrees below the ambient temperature. In some embodiments, the temperature control device 92 may be able to selective heat or cool the fluid in the inlet line 92. In some embodiments, the temperature control device 96 may be mounted external to the inlet line 92. In some embodiments, there may be a temperature sensor external to or inside of the inlet line 92 to provide feedback for control purposes.

A plurality of temperature sensors 98a, 98b, 98c, 98d are located on the plurality of delivery lines 94a, 94b, 94c, 94d. The temperature sensors 98a, 98b, 98c, 98d are configured to measure the temperature of the delivery lines 94a, 94b, 94c, 94d, respectively. Specifically, a temperature sensor 98a measures the temperature of a delivery line 94a at the location of the temperature sensor. The temperature detected by a specific temperature sensor relative to the ambient temperature is indicative of whether there is a leak in the delivery line on which the specific temperature sensor is located.

Since the BOP is in a static state, there should not be any significant flow in the delivery lines if there is no leak. Thus, the temperatures measured by the temperature sensors 98a, 98b, 98c, 98d should be the same as or very close to the ambient temperature, even though a portion of the inlet line 92 is being heated (or cooled) by the temperature control device 96. Only a localized portion of the fluid inside of the inlet line 90 is at a different temperature from the ambient temperature because of the lack of flow as well as the cooling effects environment surrounding of the rest of the inlet line 92 and delivery lines 94a, 94b, 94c, 94d, which brings the temperature back to the ambient temperature. Thus, the temperatures measured by the temperature sensors 98a, 98b, 98c, 98d should be the same as or very close to the ambient temperature in a no leak case such as that illustrated in FIG. 3. If a temperature detected at a temperature sensor is at a differential from the ambient temperature, that may indicate a leak in the delivery line.

In the some embodiments, the plurality of temperature sensors includes an array of individually addressable temperature sensors located at multiple locations along a delivery line. For example, temperature sensors 98c and 98e are both mounted on delivery line 94c, but at different locations along delivery line 94c. Similarly, temperature sensors 98e and 98f are both mounted on delivery line 94d, but at different locations along delivery line 94d. The respective temperatures detected by the array of temperature sensors is indicative of whether there is a leak in the delivery line and an approximate location of the leak. Specifically, for example, if temperature sensors 98c detects a temperature differential but temperature sensors 98e detects an ambient temperature, that may indicate that there is a leak in delivery line 94c and the leak is something between the locations of temperature sensor 98c and temperature sensor 98e. In some embodiments, the temperature detected by a temperature sensor may indicate a severity of the leak. For example, a greater differential between the detected temperature and the ambient temperature indicate a more severe leak, as a greater temperature differentially may mean that the leak is causing greater flow.

The temperature sensors 98a, 98b, 98c, 98d may be networked to provide power to each of the sensors with minimal wiring. For example, the temperature sensors 98a, 98b, 98c, 98d may a part of a CANBUS (controlled area network bus) network. In some embodiments the temperature sensors 98a, 98b, 98c, 98d may also be electrically power to the temperature control device 96 such that only one external connector is needed to provide power and communications to the temperature control device and the plurality of temperature sensors. In some embodiments, the delivery lines 94a, 94b, 94c, 94d may include various components, such as valves, connectors, a branching connection, and the like. In the illustrated embodiment, there is a valve 100a, 100b, 100c, 100d on each of the delivery lines 94a, 94b, 94c, 94d. Specifically, in the illustrated embodiment, valves 100a and 100b are closed and valves 100c and 100d are open.

FIG. 4 illustrates a representation of the hydraulic system 90, in which there is a leak in delivery line 94a, in accordance with some embodiments of the present disclosure. In this scenario, there is a leak somewhere downstream of the temperature sensor 98a. Since the fluid is pressurized, as discussed above, a leak causes a fluid in the inlet line 92 to flow towards the leak, and in some cases, out into the environment outside of the delivery line 94a. This causes the fluid heated 104 at the temperature control device 96 to flow past the temperature sensor 98a. Thus, the temperature detected at temperature sensor 98a will be higher than the ambient temperature because of the heated fluid 104 flowing past. Therefore, the leak can be detected based on the increased temperature detected at temperature sensor 98a. In the illustrated embodiment, valve 100a is supposed to be closed, and temperature sensor 98a is located substantially at valve 100a. Thus, the temperature detected at temperature sensor 98a may indicate that valve 100a is leaking. The determination of the location of leakage at valve 100a is therefore determined by a combination of the sensor feedback and the state of valve 100a (opened or closed).

FIG. 5 illustrates a representation of the hydraulic system 90, in which there is a leak in delivery line 94c, in accordance with some embodiments of the present disclosure. As illustrated, the leak 106 occurs between somewhere between the locations of temperature sensor 98c and temperature sensors 98e. In this scenario, the heated fluid 104 from the inlet line 92 flow past temperature sensor 98c as it flows towards the leak 106. Thus, the temperature detected at temperature sensor 98c is higher than the ambient temperature. However, because the heated fluid flows to the leak, which is upstream of temperature sensors 98e, the temperature detected at temperature sensor 98e is closer to or the same as the ambient temperature. Thus, based on the respective temperatures detected by temperature sensors 98c and 98e, the location of the leak 106 can be narrowed down to the portion of the delivery line between temperature sensor 98c and temperature sensors 98e.

FIG. 6 illustrates a representation of the hydraulic system 90, in which there is a leak in delivery line 94d, in accordance with some embodiments of the present disclosure. In this scenario, the leak is downstream of both temperature sensor 98d and temperature sensor 98f. Thus, the heated fluid 104 from the inlet line 92 flows past both temperature sensor 98d and temperature sensor 98f as it flows towards the leak. Thus, the temperatures detected at both temperature sensor 98d and temperature sensor 98f are higher than the ambient temperature. This indicates that there is a leak on delivery line 94d and the leak is located somewhere downstream of temperature sensor 98f. There may be more temperature sensors downstream of temperature sensor 98f such that the approximate location of the leak may be determined.

In some embodiments, there may be a preset temperature threshold, and once the detected temperature surpasses the threshold, an alert or notification may be generated, indicating a leak. In some embodiments, the ambient temperature may also be actively monitored, and if the temperature detected by the temperature sensor 98a is different from the ambient temperature by a threshold amount, an alert or notification may be generated.

A method of detecting a leak in a hydraulic system of a BOP may include determining an ambient temperature of a BOP in static state, the BOP comprising an in inlet line fluidly coupling a plurality of hydraulic delivery lines to a hydraulic source, heating or cooling the fluid at a portion of the inlet line, monitoring respective temperatures of the plurality of hydraulic delivery lines, detecting that a temperature of a specific hydraulic delivery line of the plurality of hydraulic delivery lines is different from the ambient temperature by at least a threshold amount, determining that a leak is present in the specific hydraulic delivery line, and generating an indication of the leak and the specific hydraulic delivery line. In some embodiments, the method further includes monitoring respective temperatures at a plurality of locations along the specific hydraulic delivery line, detecting that the temperatures at a one or more of the plurality of location is different from the ambient temperature by at least the threshold amount, and determining a location of the leak on the specific hydraulic delivery line based on the respective temperatures at the plurality of locations. In some embodiments, the method further includes determining a severity of the leak based on the temperature differential between the ambient temperature and the detected temperature of the specific hydraulic delivery line. In some embodiments, such a system can be created by retrofitting an existing BOP by mounting a temperature control device to the inlet line and mounting a plurality of temperature sensors to the plurality of hydraulic delivery lines.

It should be understood, however, that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element may be used alone without the other features and elements of the embodiments or in various combinations with or without other features and elements disclosed herein. This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A blowout prevention system, comprising:
a plurality of components, including at least one of an annular preventer or a ram;
a hydraulic system with leak detection, the hydraulic system comprising:
an inlet line fluidly coupled to receive a pressurized fluid from a hydraulic source;
a plurality of delivery lines fluidly coupled to the inlet line and providing hydraulic fluid to the plurality of components;
a temperature control device located on the inlet line, wherein the temperature control device creates a differential between the temperature of a fluid inside the inlet line at the location of the temperature control device and an ambient temperature; and a plurality of temperature sensors located on the plurality of delivery lines at different locations, the plurality of temperature sensors monitoring the temperature of the delivery line at the respective locations; and a control system that:
   receives temperature data from the plurality of temperature sensors;
   determines that the temperature detected by one or more of the plurality of temperature sensors differs from the ambient temperature by at least a threshold amount; and
   determines that a leak is present in a specific delivery line; and
   generates an indication of the leak and the specific delivery line.

2. The blowout prevention system of claim 1, wherein the temperature control device includes a heating element to raise the temperature of the fluid inside the inlet line at the location of temperature control device to a predetermined number of degrees above the ambient temperature.

3. The blowout prevention system of claim 1, wherein the temperature control device includes a cooling element to lower the temperature of the fluid inside the inlet line at the location of temperature control device to a predetermined number of degrees below the ambient temperature.

4. The blowout prevention system of claim 1, wherein the temperature detected by a specific temperature sensor of the plurality of temperature sensors relative to the ambient temperature is indicative of whether there is a leak in the deliver line on which the specific temperature sensor is located.

5. The blowout prevention system of claim 1, wherein the plurality of temperature sensors includes an array of individually addressable temperature sensors located at multiple locations along a specific delivery line of the plurality of delivery lines, and wherein the respective temperatures detected by the array of temperature sensors is indicative of whether there is a leak in the specific delivery line and an approximate location of the leak on the specific delivery line.

6. The blowout prevention system of claim 1, further comprising:
   an external connector for providing power and communications to the temperature control device and the plurality of temperature sensors.

7. A leak detection system, comprising:
   one or more components actuated at least in part by hydraulics;
   an inlet line fluidly coupled to receive a pressurized fluid from a hydraulic source;
   a plurality of delivery lines fluidly coupled to the inlet line and providing hydraulic fluid to the one or more components;
   a temperature control device located on the inlet line, wherein the temperature control device creates a temperature differential in a fluid inside the inlet line at the location of the temperature control device from an ambient temperature;
   a plurality of temperature sensors located on the plurality of delivery lines at different positions, the plurality of temperature sensors configured to measure the temperature of the plurality delivery line, respectively; and a control system that:
   receives temperature data from the plurality of temperature sensors;
   determines that the temperature detected by one or more of the plurality of temperature sensors differs from the ambient temperature by at least a threshold amount;
   determines that a leak is present in a specific delivery line; and
   generates an indication of the leak and the specific delivery line.

8. The system of claim 7, wherein the temperature control device includes a heating element configured to raise the temperature of the fluid inside the inlet line at the location of temperature control device to a predetermined number of degrees above the ambient temperature.

9. The system of claim 7, wherein the temperature control device includes a cooling element configured to lower the temperature of the fluid inside the inlet line at the location of temperature control device to a predetermined number of degrees below the ambient temperature.

10. The system of claim 7, wherein the temperature control device is externally mounted to the inlet line.

11. The system of claim 7, wherein a least one of the plurality of delivery lines includes one or more of: a valve, a hydraulic connection, or a branching connections.

12. The system of claim 7, wherein the plurality of temperature sensors includes a specific temperature sensor located along a specific deliver line of the plurality of delivery lines, wherein the temperature detected by the specific temperature sensor is indicative of whether there is a leak in the specific delivery line.

13. The system of claim 12, wherein the plurality of temperature sensors includes an array of temperature sensors located along the specific deliver line, and wherein the respective temperatures detected by the array of temperature sensors is indicative of an approximate location of the leak in the specific delivery line.

14. The system of claim 12, wherein the temperature detected by the specific temperature sensor is indicative of a severity of the leak, wherein a greater differential between the detected temperature and the ambient temperature is indicative of a more severe leak.

15. The system of claim 7, wherein the plurality of temperature sensors are a part of a CANBUS (controlled area network bus) network.

16. A method of detecting a leak in a hydraulic system of a BOP, comprising:
   determining an ambient temperature of a BOP in static state, the BOP comprising an inlet line fluidly coupling a plurality of hydraulic delivery lines to a hydraulic source;
   heating or cooling the fluid at a portion of the inlet line;
   monitoring respective temperatures of the plurality of hydraulic delivery lines;
   detecting that a temperature of a specific hydraulic delivery line of the plurality of hydraulic delivery lines is different from the ambient temperature by at least a threshold amount;
   determining that a leak is present in the specific hydraulic delivery line; and
   generating an indication of the leak and the specific hydraulic delivery line.

17. The method of claim 16, further comprising:
monitoring respective temperatures at a plurality of locations along the specific hydraulic delivery line;
detecting that the temperatures at a one or more of the plurality of location is different from the ambient temperature by at least the threshold amount; and
determining a location of the leak on the specific hydraulic delivery line based on the respective temperatures at the plurality of locations.

18. The method of claim 16, further comprising:
determining a severity of the leak based on the temperature differential between the ambient temperature and the detected temperature of the specific hydraulic delivery line.

19. The method of claim 16, further comprising:
mounting a temperature control device to the inlet line.

20. The method of claim 16, further comprising:
mounting a plurality of temperature sensors to the plurality of hydraulic delivery lines.

\* \* \* \* \*